(12) United States Patent
Tait

(10) Patent No.: US 6,348,955 B1
(45) Date of Patent: Feb. 19, 2002

(54) TUNER WITH SWITCHED ANALOG AND DIGITAL DEMODULATORS

(75) Inventor: David S. Tait, Wood Dale, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/027,688

(22) Filed: Feb. 23, 1998

(51) Int. Cl.[7] .............................. H04N 5/50; H04N 5/44; H04N 5/52; H04N 9/66; H04B 7/00; H04B 1/16

(52) U.S. Cl. ........................ 348/731; 348/725; 348/726; 348/735; 348/678; 348/638; 348/732; 455/246.1; 455/214; 455/337

(58) Field of Search ................................. 348/725, 726, 348/731, 735, 678, 638, 639, 705, 706, 732, 733, 10, 554–556, 558; 455/553, 245.1, 246.1, 247.1, 337, 214

(56) References Cited

U.S. PATENT DOCUMENTS 5,418,815 A * 5/1995 Ishikawa et al. ............ 375/216
5,638,112 A * 6/1997 Bestler et al. ................. 348/10
5,774,195 A * 9/1998 Miyahara et al. ........... 348/726
5,825,833 A * 10/1998 Sakue ......................... 375/344
5,956,098 A * 9/1999 Mizukami et al. .......... 348/735
6,005,640 A * 12/1999 Strolle et al. ................ 348/726
6,014,178 A * 1/2000 Jeon et al. ................... 348/554
6,016,170 A * 1/2000 Takayama et al. .......... 348/731

* cited by examiner

Primary Examiner—Reinhard J Eisenzopf
Assistant Examiner—Paulos Natnael

(57) ABSTRACT

A television receiver includes a tuner for receiving either analog or digital signals. Separate analog and digital demodulators are selectively coupled to the tuner through an RF switch that is controlled by a sync detector in the output of the analog demodulator. The selected one of the demodulators develops an AGC signal that is coupled to the tuner through the RF switch. In one embodiment, a two pole RF switch is used with one pole switching the IF signal and the other pole switching the AGC signal In another embodiment, a single pole RF switch is used with the tuner signal and the AGC signal being multiplexed through the switch. This is accomplished by the provision of a high frequency path and a low frequency path between each of the RF switch and the tuner, the RF switch and the analog demodulator, and the RF switch and the digital demodulator.

3 Claims, 1 Drawing Sheet

TUNER WITH SWITCHED ANALOG AND DIGITAL DEMODULATORS

BACKGROUND OF THE INVENTION AND PRIOR ART

This invention relates generally to television receivers and specifically to television receivers that are capable of receiving both analog and digital signals.

The recently adopted standards for advanced television broadcasting envisions the coexistence of both analog and digital television signals for a number of years. It would therefore be desirable for a single television receiver to have the capability of receiving both analog and digital signals. A solution would be to employ separate "front ends" in the television receiver, one for analog signals and one for digital signals. Such a receiver would minimally include two tuners and two IF demodulators and would not be cost effective. The solution of the invention uses one tuner and switches the IF and AGC signals between the single tuner and separate demodulators. It should be noted that the terms RF and IF are used interchangeably in the specification and the claims and the particular frequencies are not to be considered limiting of the invention. It is also recognized that many personal computer manufacturers are including (or contemplate including) additional circuitry in their computers to enable the computer to function as a television receiver. Accordingly, the invention is not limited to television receivers.

A potential solution to the above problems is to incorporate an RF splitter between the tuner and the demodulators to permit supplying both demodulators with the IF signal. The signal loss in the splitter would, however, appear to seriously degrade the receiver noise performance. Another potential solution is to amplify the IF signal before splitting it. This technique could seriously degrade the distortion characteristics of the digital receiver in the presence of strong adjacent channel analog signals.

The invention is directed to a low cost switching system for supplying the IF output from a single tuner to separate analog and digital demodulators. The inventive system in a first aspect incorporates an RF relay to switch the IF signal between the analog and digital demodulators and to couple the AGC signal back to the tuner. In another aspect of the invention, the switching is minimized by multiplexing the very low frequency AGC signal with the high frequency (45 MHz) IF signal. The multiplexing is accomplished by means of separate high frequency and low frequency paths between the tuner and the RF switch, between the RF switch and the analog demodulator and between the RF switch and the digital demodulator. Objects of the Invention A principal object of the invention is to provide a novel television receiver that is capable of receiving both digital and analog signals.

Another object of the invention is to provide a low cost method of processing digital and analog television signals using a single tuner.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
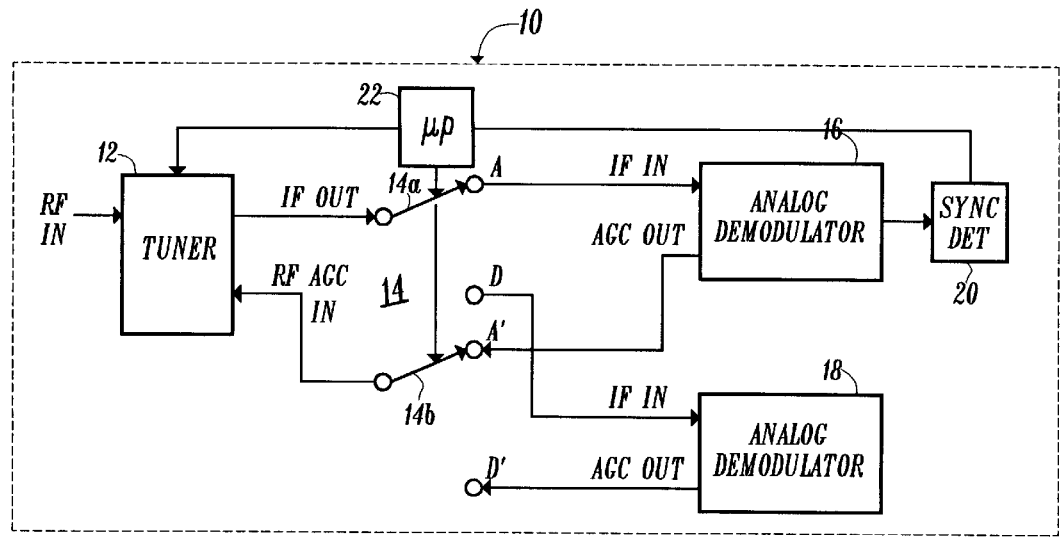
FIG. 1 is a partial block diagram of a television receiver constructed in accordance with a first aspect of the invention.

Referring to FIG. 1 of the drawings, a dashed-line block 10 indicates a television receiver that includes a tuner 12 that is capable of receiving both analog and digital television signals and converting them to an IF signal. (It will be appreciated that either a single conversion or a double conversion tuner may be used, the present preference being for a double conversion tuner). The IF signal is supplied to a first pole 14a of a two-pole RF switch 14 that is selected for its low noise and loss characteristics for RF signals. Pole 14a is selectively connectable to a pair of terminals A and D, with terminal A being coupled to an analog demodulator 16 and terminal D being coupled to a digital demodulator 18. Switch 14 has a second pole 14b that is selectively connectable between a pair of terminals A' and D'. Analog demodulator 16 supplies a sync separator 20, of conventional design, for separating the sync signals in the demodulated analog signal. Sync separator 20 is connected to a microprocessor 22 that controls tuner 12 and the operation of switch 14. Specifically, in the presence of syncs corresponding to a demodulated analog type signal, microprocessor 22 causes switch 14 to connect its pole 14a to terminal A which routes the IF signal from tuner 12 to analog demodulator 16. In the absence of syncs corresponding to a demodulated analog type signal, microprocessor causes switch 14 to connect its pole 14a to terminal D to couple the IF signal to digital demodulator 18.

The demodulators selectively develop an AGC signal, in response to the received IF signal, for controlling the gain of the tuner. The developed AGC signal from analog demodulator 16 is coupled to terminal A' of switch 14 and the AGC signal from digital demodulator 18 is coupled to terminal D' of switch 14. When switch 14 is in its analog position, poles 14a and 14b couple the IF signal from tuner 12 to analog demodulator 16 and the AGC signal from analog demodulator 16 to tuner 12, respectively. Conversely, when switch 14 is in its digital position, the IF signal from tuner 12 is coupled to digital demodulator 18 via pole 14a and terminal D and the AGC signal is coupled back to tuner 12 from digital demodulator 18 via terminal D' and pole 14b.

Figure 2:
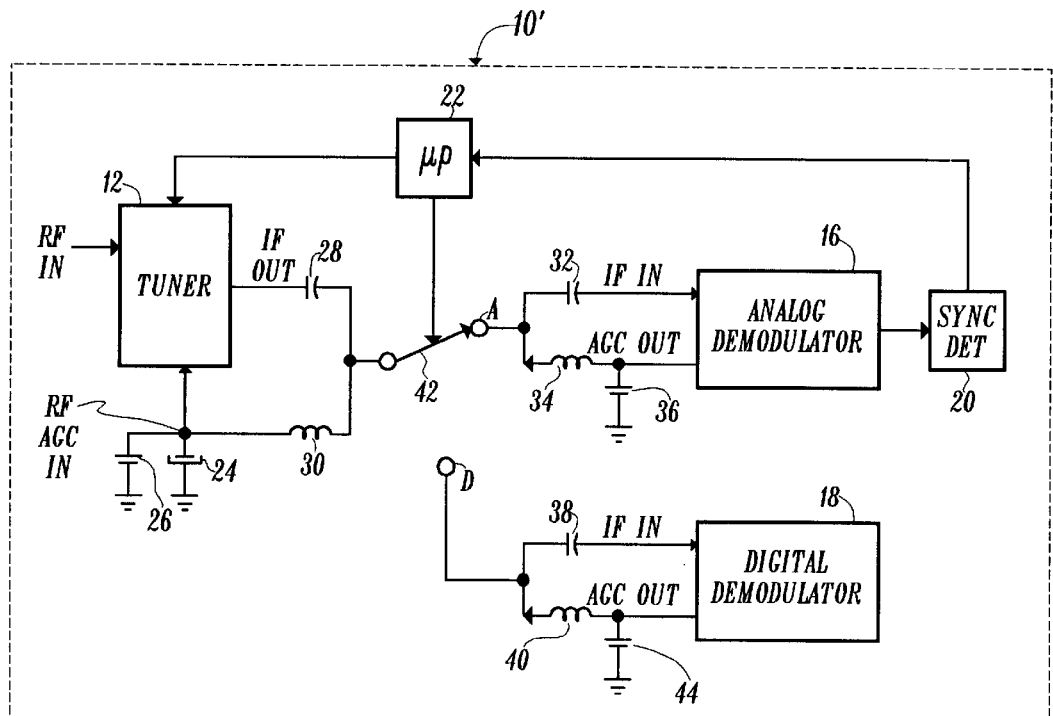
FIG. 2 is a partial block diagram of a television receiver constructed in accordance with a second aspect of the invention.

The embodiment of the invention in FIG. 2 incorporates an RF switch 42 having a single pole that is movable between terminals A and D. Both the RF signal switching and the AGC signal switching are accomplished by switch 42. This is achieved by multiplexing the RF signal and the AGC signal and incorporating circuitry for discriminating between the signals based upon their difference in frequency. A small capacitor 28 couples the IF signal from tuner 12 to switch 42 and a coil 30 couples the AGC signal from switch 42 to tuner 12. The AGC signal is filtered by a filter capacitor 24 that is bypassed to ground by a small capacitor 26. Terminal A of switch 42 is coupled through a small capacitor 32 to analog demodulator 16 for supplying the IF signal, and is supplied with the AGC signal from analog demodulator 16 through a coil 34, the input side of which is bypassed to ground via a small capacitor 36. Similarly, terminal D of switch 42 couples the IF signal to digital demodulator 18 by means of a small capacitor 38 and receives the AGC output of digital demodulator 18 through a coil 40, the input side of which is bypassed to ground through a small capacitor 40.

As in the FIG. 1 embodiment, microprocessor 22 controls the operation of switch 42 in accordance with the type of signal (analog or digital) that is received. Specifically, the presence of syncs associated with a demodulated analog signal is communicated to the microprocessor. The IF signal (high frequency) paths are through capacitors 28, 32 and 38 and the AGC signal (low frequency) paths are through coils 30, 34 and 40. The bypass capacitors 26, 36 and 44 are provided to remove any high frequencies from the AGC signal. In the actual circuit, all capacitors are 0.001 microfarads and all coils are 10 microhenries in value.

What has been described is a novel television receiver that is capable of receiving both analog and digital signals. It is recognized that numerous changes to the described embodiment of the invention will be apparent without departing from its true spirit and scope. The invention is to be limited only as defined in the claims.

What is claimed is:

1. A method of operating a television receiver for receiving either analog or digital signals comprising:
    providing an analog demodulator and a digital demodulator;
    providing RF switching means for selectively switching the tuner signal between the analog demodulator and the digital demodulator;
    developing an AGC signal from the selected one of the analog and digital demodulators;
    multiplexing the AGC signal with the tuner signal through the RF switching means;
    developing the AGC signal from the selected one of the demodulators; and
    wherein the multiplexing step is performed on the basis of the frequency difference between the tuner signal and the AGC signal;
    developing a first signal indicative of the type of tuner signal; and
    controlling the RF switching means with the first signal.

2. A television receiver for receiving either analog or digital signals comprising:
    an analog demodulator and a digital demodulator;
    an RF switch coupled between said tuner and said demodulators for selectively coupling the tuner signal between said analog demodulator and said digital demodulator;
    means for developing an AGC signal from the selected one of said analog and said digital demodulators;
    means for multiplexing said AGC signal with said tuner signal through said RF switch;
    said multiplexing means operating on the basis of the frequency difference between the tuner signal and the AGC signal;
    means for developing a first signal indicative of the type of said tuner signal; and
    means for controlling said RF switch with said first signal.

3. The receiver of claim 2, wherein said RF switching means includes an RF switch, said AGC signal is developed from the selected one of said demodulators; and said multiplexing means includes:
    a high frequency path and a low frequency path coupled between each of
        said RF switch and said tuner; said RF switch and said analog demodulator; and
        said RF switch and said digital demodulator.

* * * * *